(12) United States Patent
Levi

(10) Patent No.: US 8,809,701 B2
(45) Date of Patent: Aug. 19, 2014

(54) CONNECTING DEVICE FOR ELECTRICAL JUNCTION BOXES

(75) Inventor: Bruno Levi, Brescia (IT)

(73) Assignee: Palazzoli S.p.A., Brescia (IT)

( * ) Notice: Subject to any disclaimer, the term of this patent is extended or adjusted under 35 U.S.C. 154(b) by 137 days.

(21) Appl. No.: 13/698,825

(22) PCT Filed: Jun. 30, 2011

(86) PCT No.: PCT/EP2011/003225
§ 371 (c)(1),
(2), (4) Date: Nov. 19, 2012

(87) PCT Pub. No.: WO2012/007108
PCT Pub. Date: Jan. 19, 2012

(65) Prior Publication Data
US 2013/0062113 A1    Mar. 14, 2013

(30) Foreign Application Priority Data

Jul. 15, 2010 (IT) .............................. MI2010A1307

(51) Int. Cl.
*H02G 3/08* (2006.01)
(52) U.S. Cl.
CPC .............. *H02G 3/083* (2013.01); *H02G 3/086* (2013.01)
USPC ............ 174/669; 174/666; 174/668; 439/301
(58) Field of Classification Search
CPC ...................................................... H02G 3/083
USPC ................... 174/669, 666, 668; 439/301, 488
See application file for complete search history.

(56) References Cited

U.S. PATENT DOCUMENTS

| 4,578,528 | A | 3/1986 | Borsh |
| 5,248,850 | A | 9/1993 | Laney |
| 6,066,807 | A | 5/2000 | Gudgeon |
| 7,459,643 | B2 * | 12/2008 | de la Borbolla .............. 174/655 |
| 8,415,571 | B2 * | 4/2013 | Kiely et al. ................... 174/669 |

FOREIGN PATENT DOCUMENTS

| EA | 011341 B1 | 2/2009 |
| EP | 1432092 A1 | 6/2004 |
| RU | 2186449 C2 | 7/2002 |

* cited by examiner

*Primary Examiner* — Dhirubhai R Patel
(74) *Attorney, Agent, or Firm* — R. Neil Sudol; Henry D. Coleman

(57) ABSTRACT

A connecting device for electrical junction boxes, including a sleeve member that can be inserted in a first hole of a first wall of a first box and in a second hole provided in a second wall of a second box to be joined to the first box. An annular gasket is fitted around the sleeve and is located between the two walls. The sleeve has a first end provided with a plate that is internal to the first box and a second end provided with an abutment means that engages the inner side of the second wall. The insertion of a wedge member, which is applied between the plate and the first wall, gradually moves the plate away from the inner side, pushing the walls against each other and compressing the gasket between them.

6 Claims, 8 Drawing Sheets

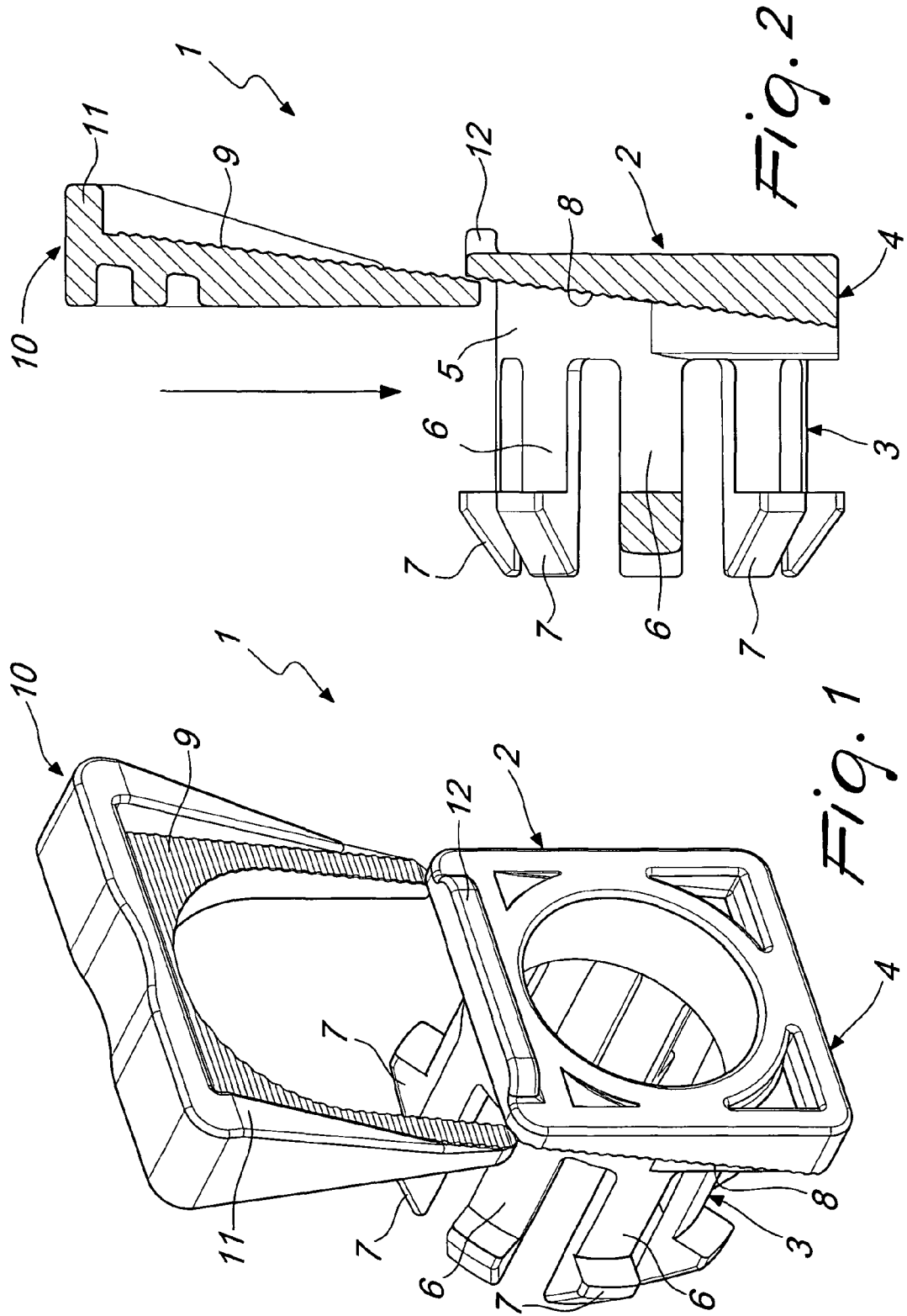

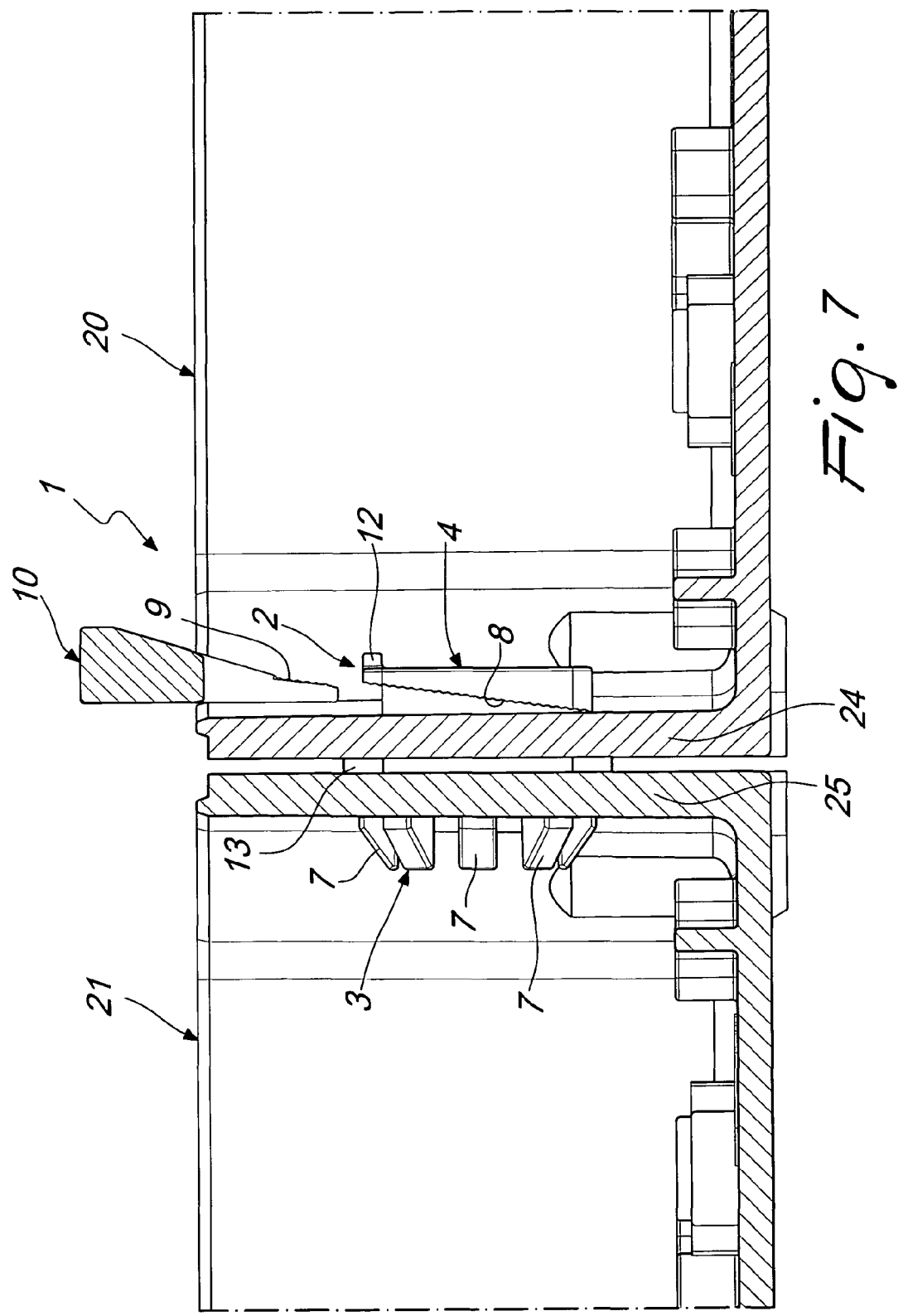

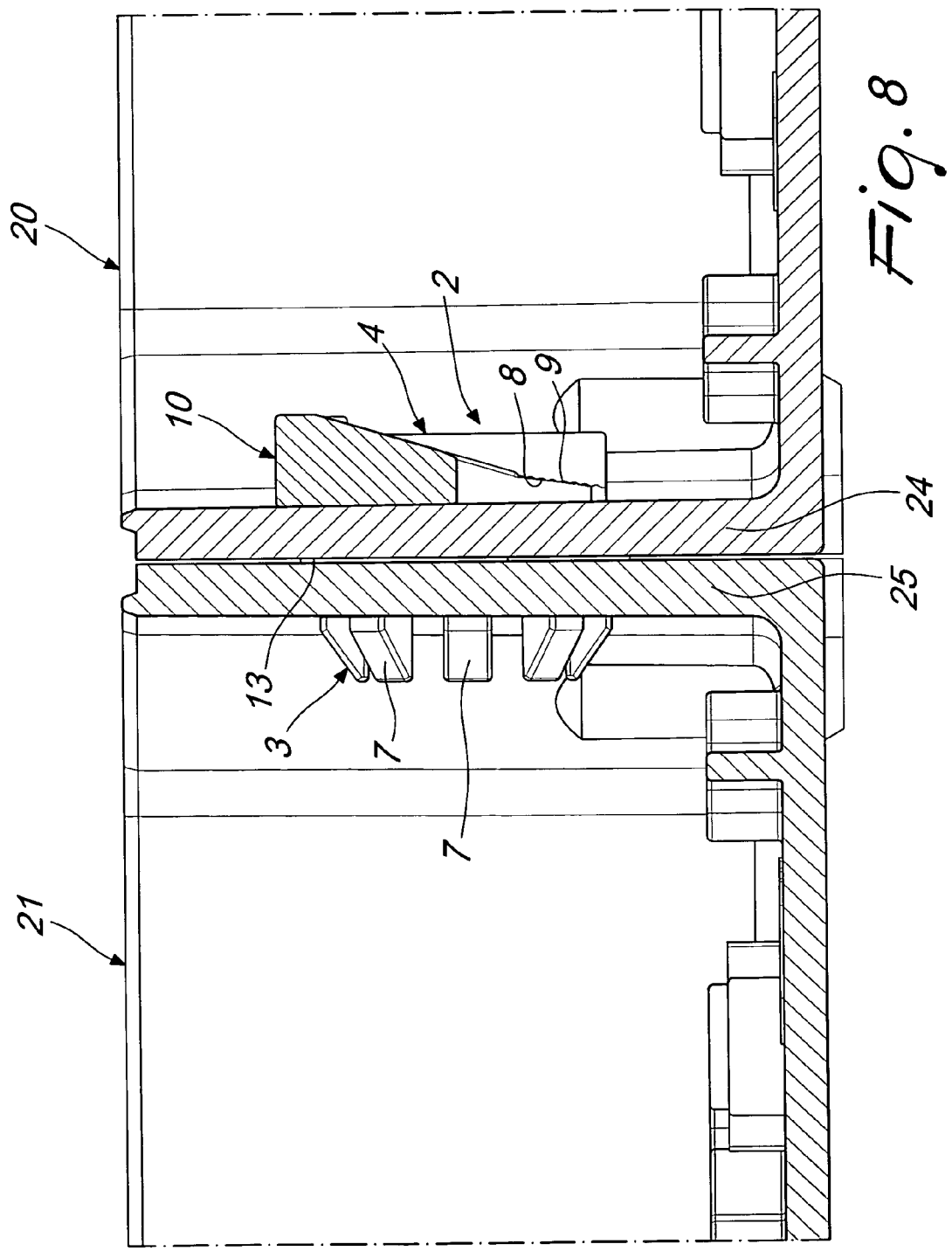

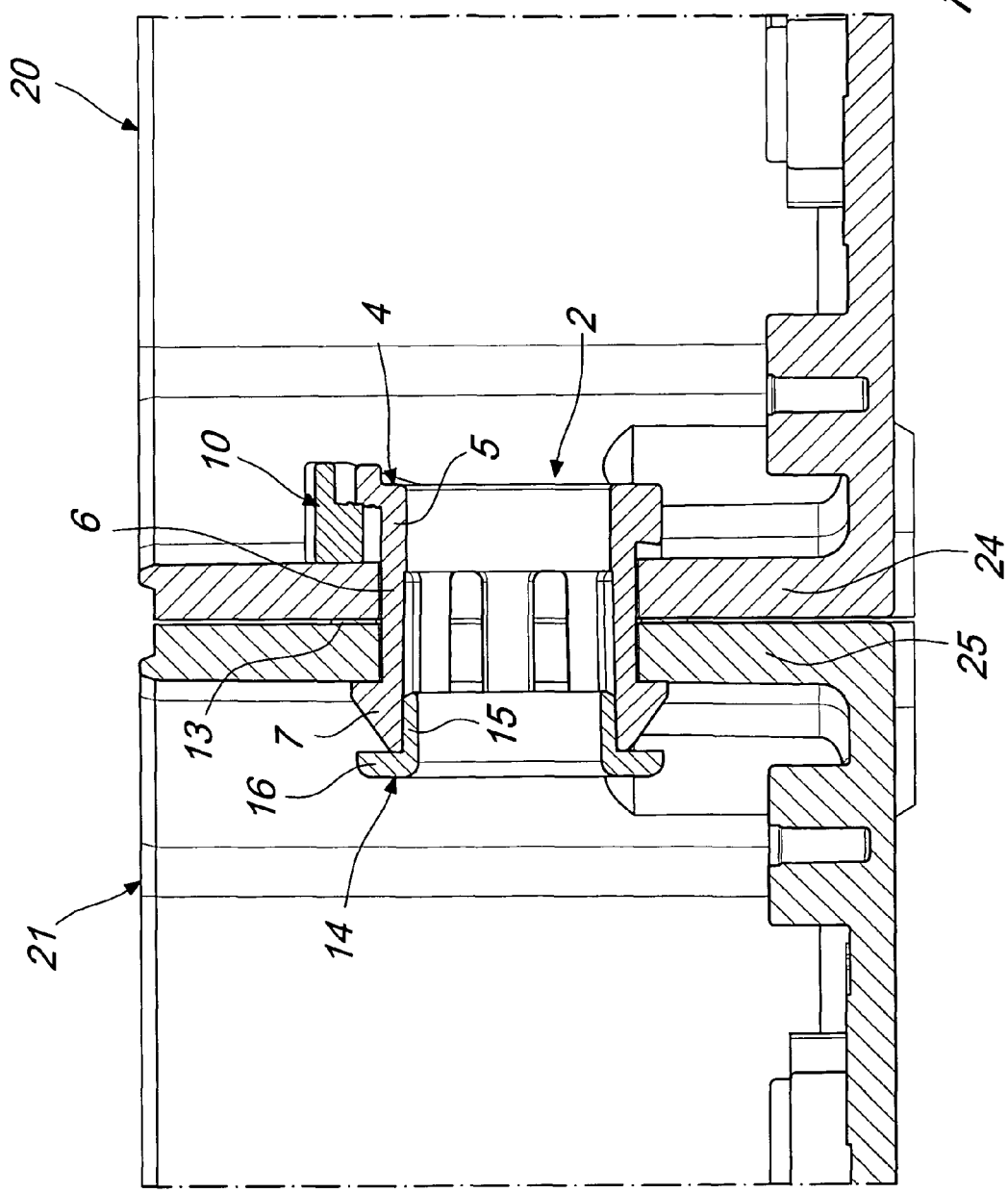

CONNECTING DEVICE FOR ELECTRICAL JUNCTION BOXES

BACKGROUND OF THE INVENTION

The present invention relates to a connecting device for electrical junction boxes.

Two adjacent electrical junction boxes are normally joined to each other by means of a threaded sleeve that is inserted in holes provided in the adjacent walls of the boxes to be joined.

The sleeve is surrounded by a gasket, which is placed between the two adjacent walls.

By tightening a ring on the sleeve, the two walls are moved mutually closer and compress the gasket, which thus provides the seal.

The connection system described above has the drawback of forcing the operator to perform an uncomfortable operation when tightening the ring at the end of the sleeve.

The operation is uncomfortable because it has to be carried out in a tight space, and is also rather time consuming.

Another drawback of the conventional system is that the operator might not tighten the ring sufficiently or might tighten it too much, in both cases causing an incorrect locking of the connection, with possible problems of tightness and reliability over time.

OBJECTS OF THE INVENTION

The aim of the present invention is to provide an electrical junction box connecting device that overcomes the drawbacks of the cited prior art.

Within the scope of this aim, an object of the invention is to provide a connecting device that can be applied with a much faster and easier operation with respect of conventional connecting systems.

A further object of the invention is to provide a connecting device that ensures a reliable and durable hermetic connection.

A further object of the present invention is to provide a device that can be produced easily, by using commonly commercially available elements and materials, and that is also economically competitive.

SUMMARY OF THE INVENTION

This aim and these and other objects, that will become better apparent, are achieved by a connecting device for electrical junction boxes, comprising a sleeve member that can be inserted in a first hole of a first wall of a first box and in a second hole provided in a second wall of a second box to be joined to said first box, an annular gasket fitted around the sleeve and located between said two walls, characterized in that said sleeve has a first end, provided with a plate internal to said first box, and a second end provided with an abutment means that engages the inner side of said second wall; a wedge member is applied between said plate and said first wall and gradually moves said plate away from said inner side, pushing said walls against each other and compressing said gasket between them.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein:

FIG. 1 is a perspective view of the device according to the present invention;

FIG. 2 is a sectional side view of the device;

FIG. 7 is a sectional side view showing of the application of the wedge to the sleeve;

FIG. 8 is a sectional side view, similar to the preceding one, of the device in conditions for a use;

FIG. 9 is a view, similar to the preceding one, showing the device with a safety ring.

DETAILED DESCRIPTION

Figure 3:
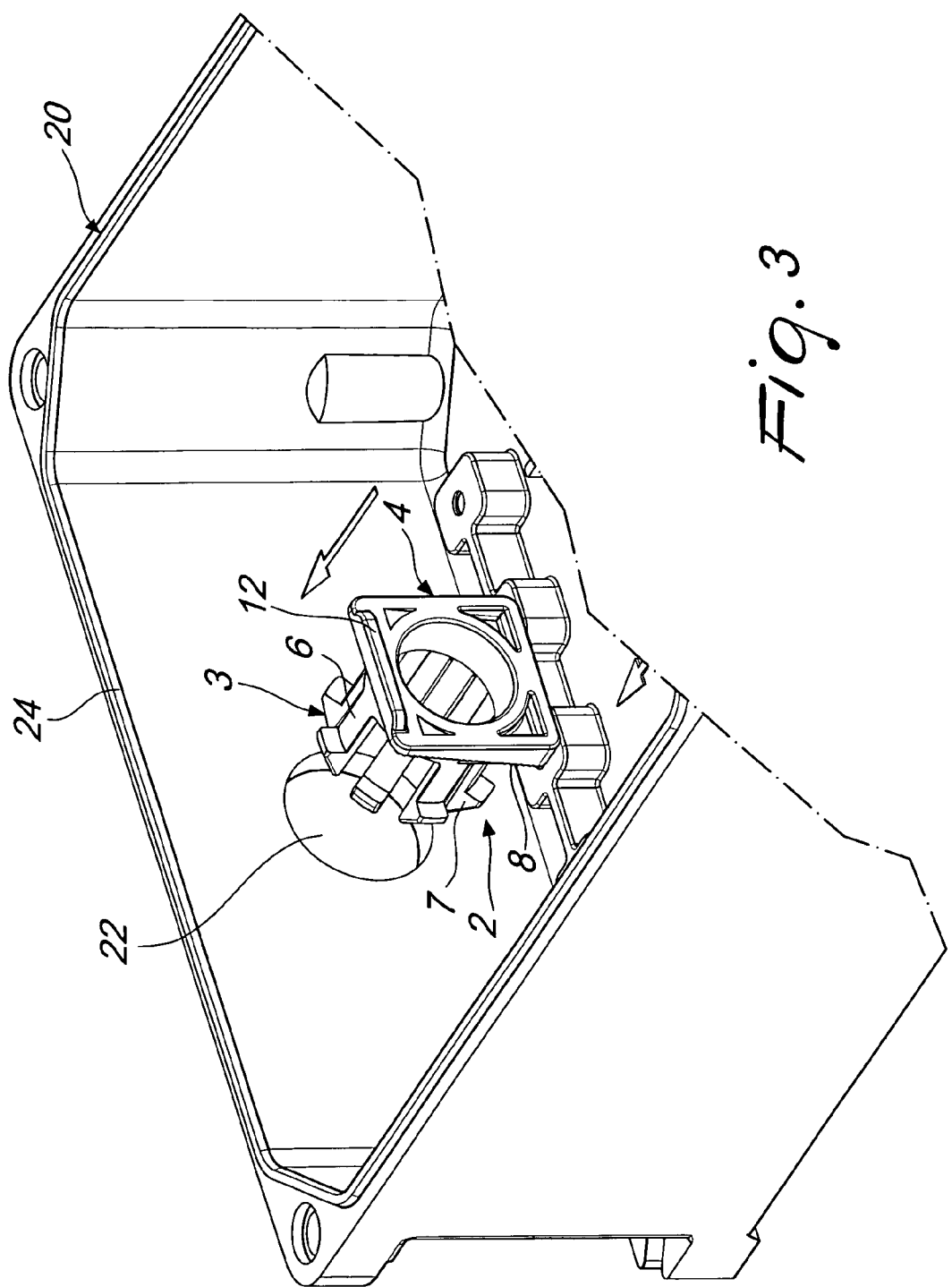
FIG. 3 is a perspective view showing the step of insertion of the sleeve in the first junction box.

With reference to the cited figures, the device according to the invention, generally designated by the reference numeral 1, comprises a sleeve member 2 which is constituted by a substantially cylindrical body 3 and a plate 4. The sleeve member 2 is made of one piece.

The cylindrical body 3 has a base portion 5, which is joined to the plate 4, and a plurality of protrusions 6. Each protrusion 6 ends with a tooth 7.

Each tooth 7 has a front inclined guiding plane and a rear plane that lies at right angles to the directrix of the cylindrical body 3.

The plate 4 has a front inclined plane 8 extending around the base 5 of the cylindrical body 3, on the two sides of the plate and above the cylindrical body.

The inclined front plane 8 has a set of teeth constituted by teeth that lie horizontally.

The device 1 also comprises a wedge member 10, which is constituted by a fork body that has at least one rear inclined plane 9 adapted to cooperate with the inclined plane 8 of the sleeve member 2.

The rear inclined plane 9 is surrounded, laterally and in an upper region, by an edge 11, which is adapted to abut an upper retention edge 12 of the plate 4 of the sleeve member 2.

The connecting device 1 also comprises an annular gasket 13, which is adapted to surround the cylindrical body of the sleeve member 2.

The connecting device 1 may also comprise a locking ring 14, which is constituted by a cylindrical portion 15 connected to an annular edge 16.

The operation of the connecting device 1 according to the present invention is evident with particular reference to FIGS. 3-9, which illustrate the sequence of operations for its application to a pair of boxes, designated respectively by the reference numerals 20 and 21, to be connected.

First of all, the cylindrical body 3 of the sleeve member 2 is inserted in the first hole 22 of the first box 20, as can be seen in FIG. 3.

The insertion of the sleeve member is allowed by the elastic deformation undergone by the protrusions 6, allowing the teeth 7 to enter the hole 22, whose diameter is equal or close to the outside diameter of the cylindrical body 3.

Figure 4:
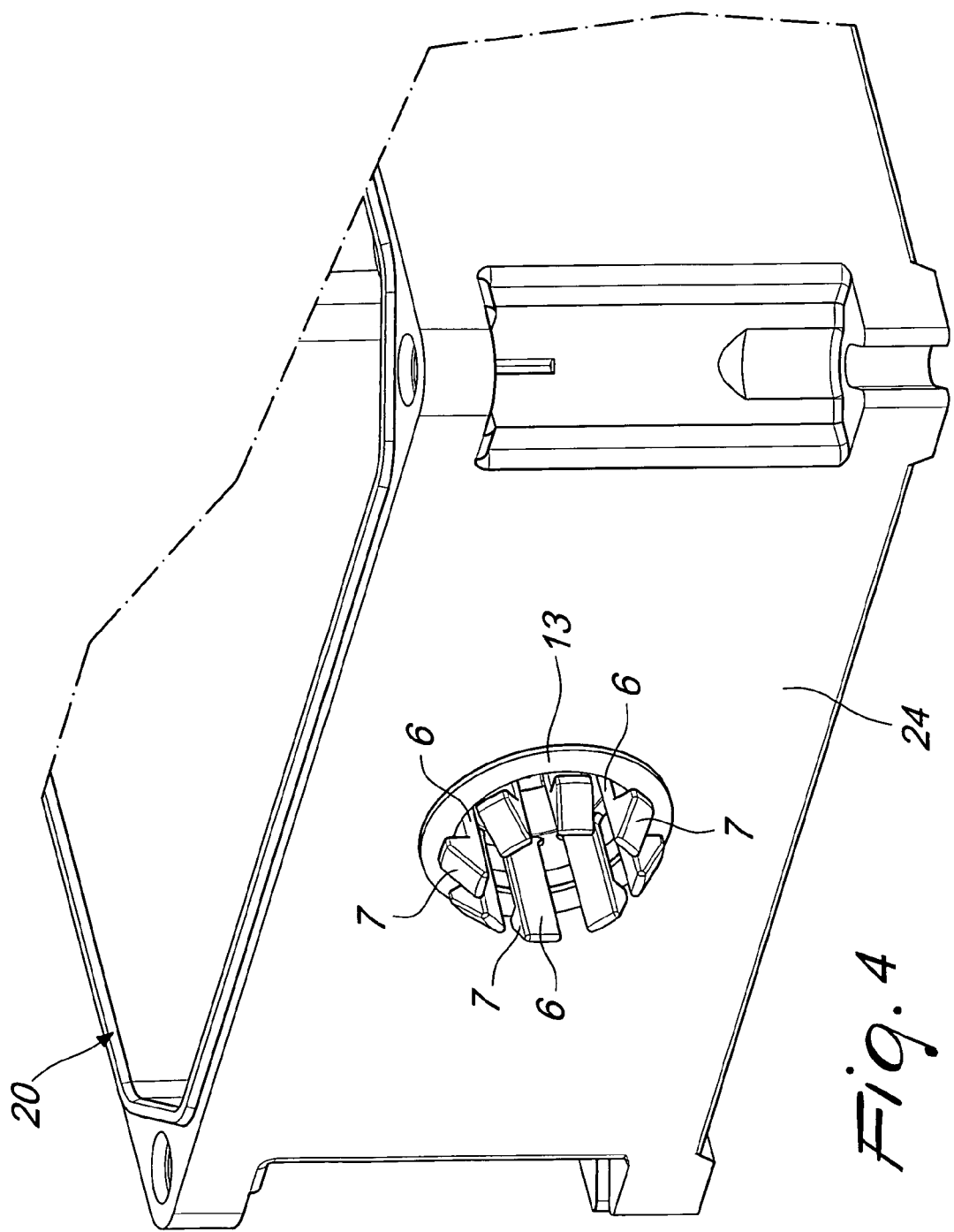
FIG. 4 is a perspective view of the gasket applied to the sleeve.

When the cylindrical body is inserted in the first hole 22, the annular gasket 13 is applied around the cylindrical body, in a position that is comprised between the outer wall 24 of the first box 20 and the teeth 7 of the cylindrical body 3, as can be seen in FIG. 4.

Figure 5:
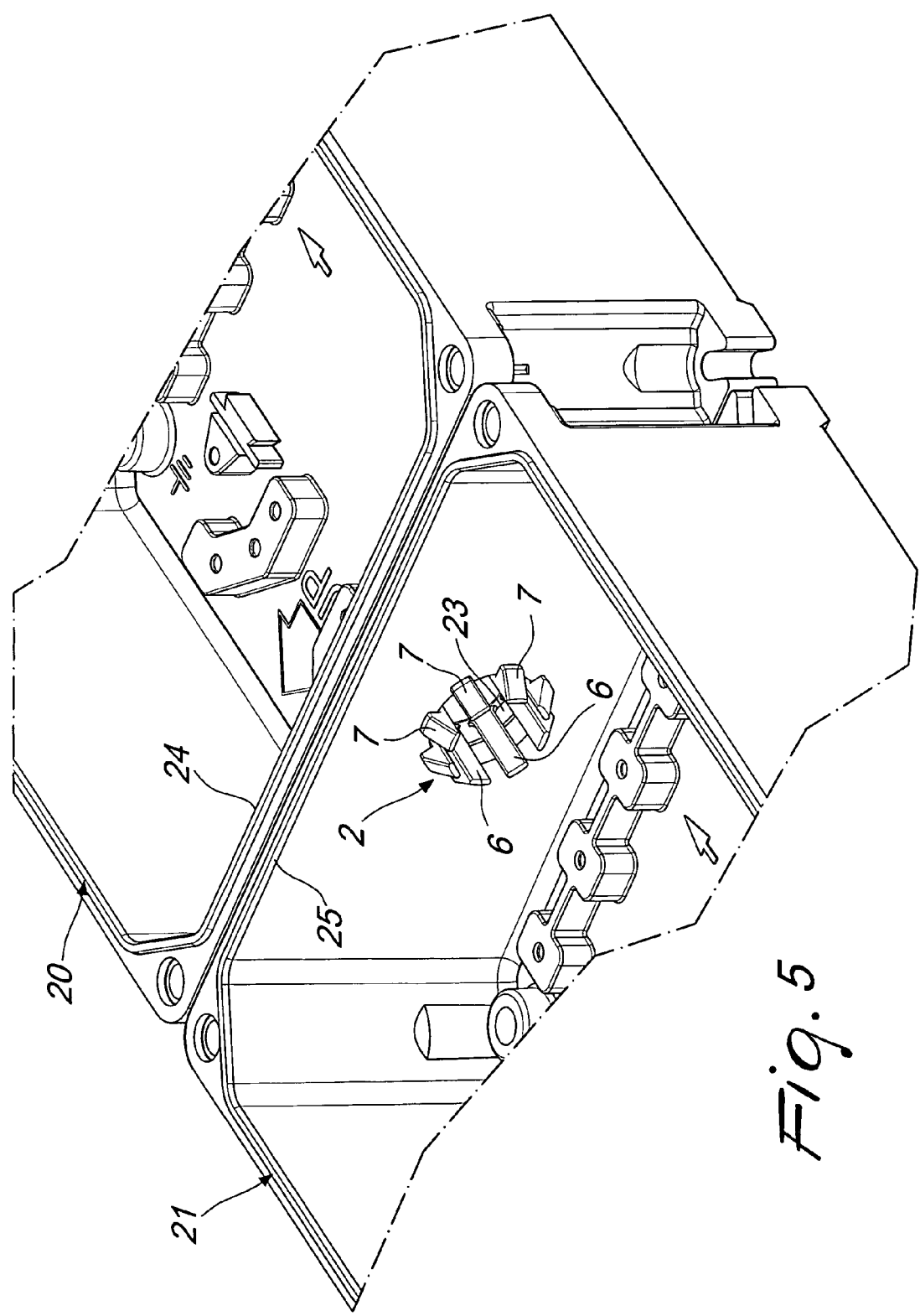
FIG. 5 is a perspective view showing the application of the second junction box.

Subsequently, the second box 21 is applied, making the teeth 7 of the cylindrical body 3 enter the hole 23 of the second box 21, as can be seen in FIG. 5. In this manner the annular gasket 13 is comprised between the outer wall 24 of the first box 20 and the outer wall 25 of the second box 21, as can be seen in FIG. 7.

In this position, the rear planes of the teeth 7 of the sleeve member 2 abut against the inner side of the wall of the second box 21, preventing the sleeve from disengaging from the hole 23 and thus preventing the separation of a box from the other one.

Figure 6:
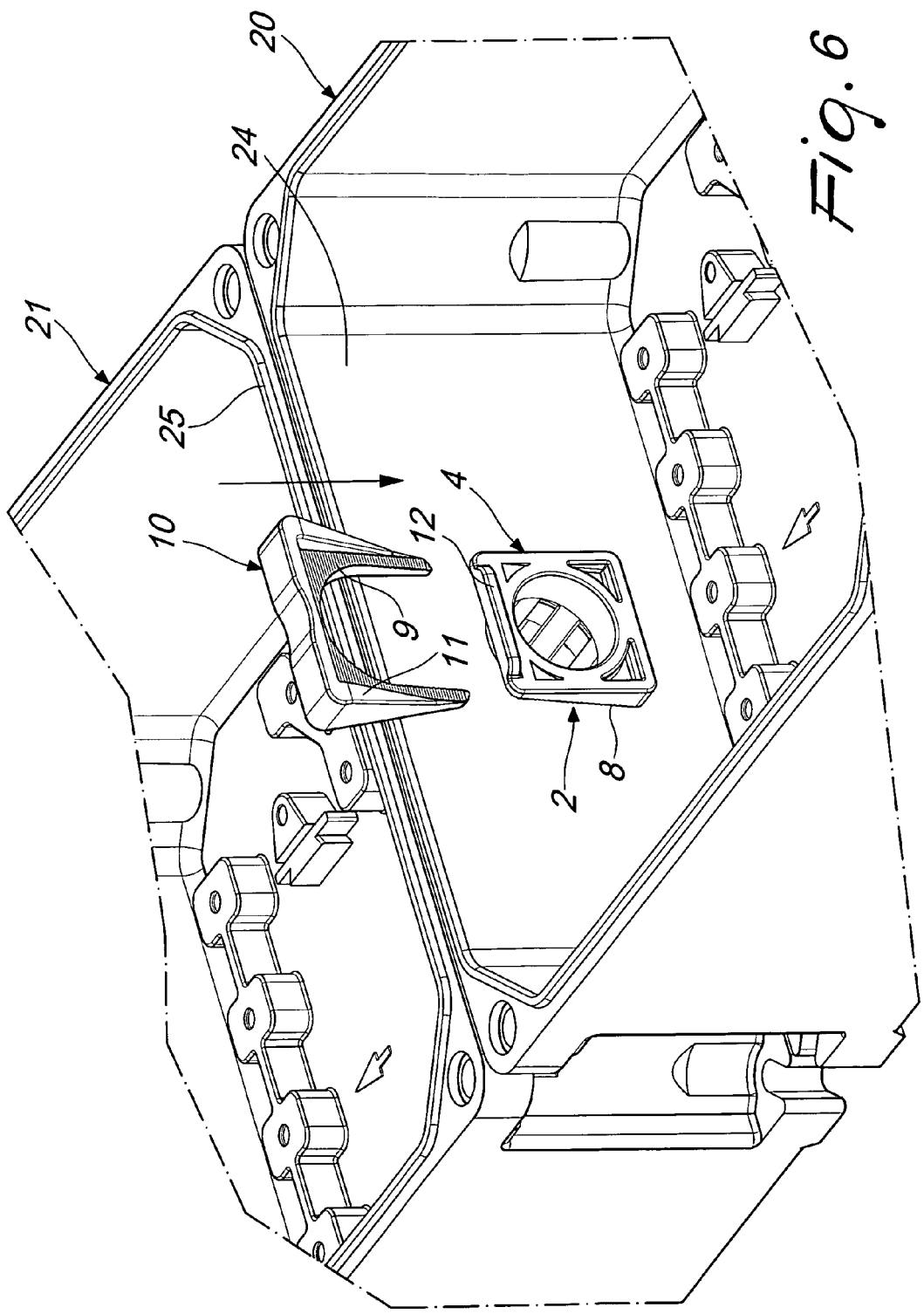
FIG. 6 is a view showing the application of the wedge to the sleeve.

At this point, the wedge member 10 is inserted between the plate 4 of the sleeve member 2 and the inner side of the wall 24 of the first box, so that the inclined planes 8 and 9 are mutually opposite, as can be seen in FIGS. 6 and 7.

By pushing the wedge member 10 completely, the two walls 24 and 25 of the respective boxes 20 and 21 are pushed against each other, thus compressing the gasket 13 comprised between them and locking the two boxes to each other, as can be seen in FIG. 8.

In this position, the gasket 13, which is compressed between the two walls, provides the seal on the region of the cylindrical body 3 of the sleeve member, preventing infiltrations of moisture and dirt.

The horizontal sets of teeth on the two inclined planes 8 and 9 prevent the wedge member 10 from disengaging from the locking position and also facilitates the insertion. In this manner the user can better appreciate the degree of insertion by virtue of the snap movement caused by the sets of teeth.

The device can optionally have a locking ring 14, which is applied to the free end of the sleeve member 2, at the teeth 7, in order to prevent the teeth from closing onto each other and disengaging from the hole 23 of the second box 21.

In practice it has been found that the invention achieves the intended aim and objects, providing a connecting device that allows to connect two electrical junction boxes with an operation that is quick and easy.

The wedge-like locking system greatly facilitates the locking operation, because the operator simply has to push the wedge between the plate of the sleeve and the inner wall of one box, instead of screwing on the ring at the end of the sleeve as in traditional systems.

The application of the device according to the present invention is much easier and faster than screwing on a ring in the tight space of the inside of the box.

Another important technical advantage of the present invention is that the locking tension, and therefore the degree of deformation imparted to the sealing gasket, can be set during production, by sizing the inclined planes appropriately, so that the operator simply has to insert the wedge member completely, contrary to conventional thread systems, in which the operator must instead adjust the locking force of the threaded ring.

This application claims the priority of Italian Patent Application No. MI2010A001307, filed on Jul. 15, 2010, the subject matter of which is incorporated herein by reference.

The invention claimed is:

1. A connecting device for electrical junction boxes, comprising a sleeve member that can be inserted in a first hole in a first wall of a first box and in a second hole provided in a second wall of a second box, said sleeve joining said first box and said second box to one another, and further comprising an annular gasket fitted around the sleeve and located between said first wall and said second wall, wherein said sleeve has a first end, provided with a plate disposable internally to said first box, and a second end provided with at least one abutment element that is engageable with an inner side of said second wall; further comprising a wedge member insertable between said plate and said first wall so as to move said plate away from an inner side of said first wall and to push said first wall and said second wall against each other, whereby said boxes are held to one another and said gasket is compressed between said first wall and said second wall.

2. The device according to claim 1, wherein said sleeve member is constituted by a substantially cylindrical body and said plate, said sleeve member being made of one piece; said cylindrical body has a base portion, which is joined to said plate, and a plurality of protrusions, each protrusion ends with one said abutment element in the form of a tooth.

3. The device according to claim 2, wherein said tooth has a front inclined guiding plane and a rear plane at right angles to a directrix of said cylindrical body.

4. The device according to claim 2, wherein said plate has a front inclined plane that extends around said base of said cylindrical body, on two sides of said plate and above said cylindrical body; said front inclined plane has a set of teeth constituted by teeth that lie horizontally; said wedge member is constituted by a fork body that has at least one inclined plane that cooperates with said front inclined plane of said sleeve member.

5. The device according to claim 4, wherein said at least one inclined plane of said fork body has an edge extending on lateral sides and on an upper side of said at least one inclined plane; said edge is adapted to abut an upper retention edge of said plate of said sleeve member.

6. The device according to claim 2, further comprising a locking ring, constituted by a cylindrical portion which is connected to an annular edge; said locking ring is applied to said second end of said sleeve member, at said teeth, to prevent said teeth from closing onto each other and disengaging from said second hole of said second box.

* * * * *